(12) United States Patent
Cremerius

(10) Patent No.: US 7,735,210 B2
(45) Date of Patent: Jun. 15, 2010

(54) PROCESS OF MACHINING INNER OR OUTER JOINT PARTS WITH PARALLEL PAIRS OF TRACKS

(75) Inventor: Rolf Cremerius, St. Augustin (DE)

(73) Assignee: GKN Driveline International, GmbH, Lohmar (DE)

( * ) Notice: Subject to any disclaimer, the term of this patent is extended or adjusted under 35 U.S.C. 154(b) by 1061 days.

(21) Appl. No.: 10/562,423

(22) PCT Filed: Dec. 3, 2004

(86) PCT No.: PCT/EP2004/013793

§ 371 (c)(1),
(2), (4) Date: Apr. 11, 2006

(87) PCT Pub. No.: WO2006/058555

PCT Pub. Date: Jun. 8, 2006

(65) Prior Publication Data

US 2007/0104550 A1    May 10, 2007

(51) Int. Cl.
*B23P 13/04* (2006.01)
*B24B 7/07* (2006.01)

(52) U.S. Cl. ........... 29/557; 29/898.066; 29/558; 451/52; 451/158; 451/548; 451/124; 451/133

(58) Field of Classification Search ........... 29/898.066, 29/557, 558, 27 C, 27 R; 451/52, 158, 548, 451/11, 124, 133, 160, 170; 408/53, 32, 408/33, 42, 50, 55
See application file for complete search history.

(56) References Cited

U.S. PATENT DOCUMENTS

| | | | |
|---|---|---|---|
| 2,953,069 A * | 9/1960 | Smith .................. 409/73 |
| 3,030,739 A | 4/1962 | Folley | |
| 3,277,613 A | 10/1966 | Brady et al. | |
| 3,618,191 A | 11/1971 | Willimek et al. | |
| 3,841,784 A * | 10/1974 | Mengeringhausen ......... 408/50 |
| 4,593,444 A * | 6/1986 | Kavthekar .................. 29/27 C |
| 4,625,377 A * | 12/1986 | Kavthekar ............. 29/898.043 |
| 5,577,952 A * | 11/1996 | Naumann et al. ............. 451/51 |
| 5,685,777 A | 11/1997 | Schwarzler | |
| 5,702,294 A | 12/1997 | Baltazar et al. | |
| 5,772,494 A * | 6/1998 | Muraki et al. ................. 451/52 |

(Continued)

FOREIGN PATENT DOCUMENTS

DE    81 26 582.4    11/1982

(Continued)

*Primary Examiner*—Essama Omgba
(74) *Attorney, Agent, or Firm*—Rader, Fishman & Grauer PLLC

(57) ABSTRACT

A process of machining outer joint parts (11) and inner joint parts (21) of constant velocity universal ball joints, which outer joint parts (11) and inner joint parts (21) each comprise a longitudinal axis and a number of ball tracks (12), wherein the ball tracks are each arranged circumferentially in pairs ($12_1$, $12_2$), whose central track lines are positioned in planes ($E_1$, $E_2$, $E_3$, $E_4$) extending parallel relative to one another, wherein the pairs of ball tracks (12) are machined by rotating disc tools (16) whose axes of rotation (R) perpendicularly intersect the respective longitudinal axis at a distance from one another and are held and guided coaxially relative to one another.

7 Claims, 9 Drawing Sheets

U.S. PATENT DOCUMENTS

| | | |
|---|---|---|
| 5,916,013 A | 6/1999 | Naumann et al. |
| 6,071,195 A | 6/2000 | Krude |
| 6,299,542 B1 * | 10/2001 | Ouchi et al. ................. 464/145 |
| 6,550,140 B1 * | 4/2003 | Kochsiek ............... 29/898.067 |
| 6,665,936 B1 * | 12/2003 | Kochsiek ............... 29/898.066 |
| 7,475,469 B2 * | 1/2009 | Stanik et al. .................. 29/557 |
| 2006/0283016 A1 * | 12/2006 | Cremerius ................... 29/898 |
| 2009/0046968 A1 * | 2/2009 | Lee et al. .................... 384/499 |

FOREIGN PATENT DOCUMENTS

| | | |
|---|---|---|
| DE | 4440285 | 4/1996 |
| DE | 19704761 | 8/1998 |
| DE | 103 18 408 A1 | 11/2004 |
| DE | 102004018721 | 4/2005 |
| WO | WO 02/08624 A1 | 1/2002 |

* cited by examiner

PROCESS OF MACHINING INNER OR OUTER JOINT PARTS WITH PARALLEL PAIRS OF TRACKS

TECHNICAL FIELD

The invention relates to a process of machining, in a chip forming way, outer joint parts and inner joint parts of constant velocity universal ball joints which comprise a longitudinal axis and an even number of ball tracks, wherein the ball tracks are arranged in pairs around the circumference, with the track center lines of the pairs of ball tracks being positioned in planes extending parallel relative to one another. Furthermore, the invention relates to devices for carrying out such processes.

BACKGROUND

The initially mentioned joint parts are intended for constant velocity universal ball joints which are produced by the applicant under the designation of TBJ (Twin Ball Joints) and are described in DE 10 2004 018 721.5. In a way known in itself, these constant velocity universal ball joints also comprise an outer joint part with first ball tracks positioned in an inner guiding face for a ball cage; an inner joint part with second ball tracks formed on an outer guiding face for the ball cage; balls inserted into pairs of first and second ball tracks; as well as a ball cage which holds the balls in a common plane. The ball cage is provided with individual windows for accommodating the balls.

In the TBJ joints mentioned here, both the first ball tracks in the outer joint part and the second ball tracks in the inner joint part, in turn, are arranged in pairs, with pairs of said further type being designed in such a way that they comprise central track planes positioned in parallel planes. In this way it is possible for two balls, which are guided in such pairs and whose circumferential distance from one another along the entire track length does not change, to be held in an individual common window, i.e. the number of cage windows relative to the ball tracks can be halved.

SUMMARY OF THE INVENTION

It is an object of the present invention to provide improved production processes for machining the ball tracks of the initially mentioned joint parts (outer joint part, inner joint part) of TBJ joints and to define suitable devices for carrying out such machining processes.

A first solution is a process for machining in a chip forming way outer joint parts and inner joint parts of constant velocity universal ball joints which comprise a longitudinal axis Aa, Ai and a number of ball tracks, wherein the balls tracks are circumferentially arranged in pairs whose track center lines are positioned in planes $E_1$, $E_2$, $E_3$, $E_4$ extending parallel relative to one another, wherein the pairs of tracks each are machined by rotating disc tools whose axes of rotation R intersect the respective longitudinal axis Aa, Ai perpendicularly at a distance from one another and are held and guided coaxially relative to one another. It should be appreciated that the process referred to here is able to reduce the machining times as compared to previous processes wherein each ball track had to be machined individually, because the number of re-clamping operations as well as the number of machining processes is halved.

According to a particularly advantageous embodiment, during the chip-forming machining operation, the outer joint parts and inner joint parts respectively are guided linearly in the direction of their respective longitudinal axis Aa, Ai and that the axes of rotation of the disc tools 16, 26 during the chip-forming machining operation are guided synchronously in a linear or pivoting movement radially relative to the respective longitudinal axis Aa, Ai. In this way, the movement sequences are considerably simplified, so that, at a later stage, simply designed devices for carrying out the process can be provided.

Furthermore, at least two pairs of ball tracks—more particularly radially opposed pairs of ball tracks—can be machined simultaneously. The number of re-clamping operations and the number of machining operations can again be reduced. The process referred to here applies to joint part of joints with four, six or eight pairs of tracks.

Equally, the method provides—with reference to a simplified design of the devices to be used—that the disc tools are driven in pairs at identical speeds.

A second solution provides a process for machining in a chip forming way outer joint parts and inner joint parts of constant velocity universal ball joints which comprise a longitudinal axis Aa, Ai and a number of ball tracks, wherein the balls tracks are circumferentially arranged in pairs whose track center lines are positioned in planes $E_1$, $E_2$, $E_3$, $E_4$ extending parallel relative to one another, wherein the pairs of ball tracks are machined by rotating finger tools whose axes of rotation R intersect the respective longitudinal axis Aa, Ai in pairs symmetrically relative to one another at a distance from one another and whose axes of rotation R are held and guided in pairs and parallel relative to one another.

A third solution deviating insubstantially from the second solution provides a process for machining in a chip forming way outer joint parts and inner joint parts of constant velocity universal ball joints which comprise a longitudinal axis Aa, Ai and a number of ball tracks, wherein the balls tracks are circumferentially arranged in pairs whose track center lines are positioned in planes $E_1$, $E_2$, $E_3$, $E_4$ extending parallel relative to one another, wherein the pairs of ball tracks are machined by rotating finger tools whose axes of rotation R intersect the respective longitudinal axis Aa, Ai in pairs symmetrically relative to one another at a distance from one another and whose axes of rotation R are arranged and guided in pairs at a constant angle relative to one another. Both with the disc tools and with the finger tools, the track cross-section is defined by the toot profile in a section through the axis of rotation. Whereas the axis of rotation of the disc tools is aligned at a distance from and transversely to the longitudinal track extension, the axis of rotation of finger tools is aligned substantially perpendicularly relative to the track base. With disc tools, both track flanks are thus machined in the same cutting direction, whereas with finger tools, the two track flanks are machined in opposed cutting directions.

Analogously to the process mentioned first, with the further processes using finger tools, during the chip-forming machining operation, the outer joint parts and inner joint parts can be guided linearly in the direction of their respective longitudinal axis Aa, Ai and the axes of rotation R of the finger tools, during the chip-forming machining operation, can be guided synchronously and in movements with constant angles relative to one another in such a way that an axis of symmetry Rs positioned between the axes of rotation R is guided in a linear and/or pivoting movement radially relative to the respective longitudinal axis Aa, Ai. In this case, too, for the purpose of increasing production, at least two pairs of ball tracks—more particularly radially opposed pairs of ball tracks of an inner joint part—can be machined simultaneously. With outer joint parts, machining at least two pairs can be difficult because of the available space.

With reference to providing suitable devices, the rotating finger tools are driven in pairs at identical speeds. The directions of rotation can be identical or opposite to one another.

For carrying out the process mentioned first, there is provided a device for machining in a chip-forming way the ball tracks of outer joint parts and inner joint parts, which device comprises one clamping device for an outer joint part or an inner joint part as well as two disc tools whose axes of rotation R extend coaxially relative to one another and which intersect the respective longitudinal axis Aa, Ai of the outer joint part or inner joint part perpendicularly at a distance from one another. To simplify the movements, according to a first embodiment the clamping device comprises a feeding device for ensuring axial feeding in the direction of the respective longitudinal axis Aa, Ai, and the driving device for the disc tools 16, 26 comprises only a feeding device for feeding the disc tools radially relative to the respective longitudinal axis Aa, Ai. Alternatively, the clamping device comprises a feeding device for ensuring axial feeding in the direction of the respective longitudinal axis Aa, Ai, and the driving device for the disc tools 16, 26 comprises only a pivoting device for pivoting the disc tools 16, 26 around a pivot axis intersecting the respective longitudinal axis Aa, Ai. In both cases, the mechanisms for carrying out the movements can be reduced considerably and thus become more cost-effective. More particularly, for changing the machining operation from one pair of tracks to the next pair of tracks the clamping device for the outer joint part or inner joint part is associated with a rotary drive, whereas the tools, with reference to the longitudinal axis, are arranged circumferentially fixed.

Furthermore, at least two disc tools comprise a common rotary drive. More particularly, at least two disc tools are produced so as to be integral with one another.

For carrying out the above-mentioned process mentioned first, there is provided a device for machining in a chip-forming way the ball tracks of outer joint parts and inner joint parts, which device comprises one clamping device for an outer joint part or an inner joint part as well as at least two rotating finger tools whose axes of rotation R extend parallel relative to one another and intersect the respective longitudinal axis Aa, Ai in pairs symmetrically relative to one another at a distance from one another; or it comprises a clamping device for an outer joint part or an inner joint part as well as at least two rotating finger tools whose axes of rotation R form a fixed angle relative to one another and intersect the respective longitudinal axis Aa, Ai in pairs symmetrically relative to one another at a distance from one another. Equally, for the purpose of simplifying and reducing the moving mechanism, as an alternative, the clamping device comprises a feeding device to ensure axial feeding in the direction of the respective longitudinal axis Aa, Ai, and the driving device for the finger tools comprises only a feeding device for feeding in the finger tools radially relative to the respective longitudinal axis Aa, Ai. Alternatively, the clamping device comprises a feeding device to ensure axial feeding in the direction of the respective longitudinal axis Aa, Ai, and the driving device for the finger tools comprises only a pivoting device for pivoting the finger tools around a pivot axis intersecting the respective longitudinal axis Aa, Ai. A further simplification can be achieved if the at least two finger tools comprise a common rotary drive. Such a common rotary drive for the finger tools can comprise more particularly a driven spur gear or bevel gear which engages spur gears which are positioned on the tool axes and are firmly connected with the finger tools.

BRIEF DESCRIPTION OF THE DRAWINGS

Preferred embodiments of the inventive process which include inventive devices are illustrated in the drawings and will be described below.

A) in a longitudinal section through the longitudinal axis of the outer joint part; and B) in a cross-section through the longitudinal axis of the outer joint part.

Figures 2A, 2B:
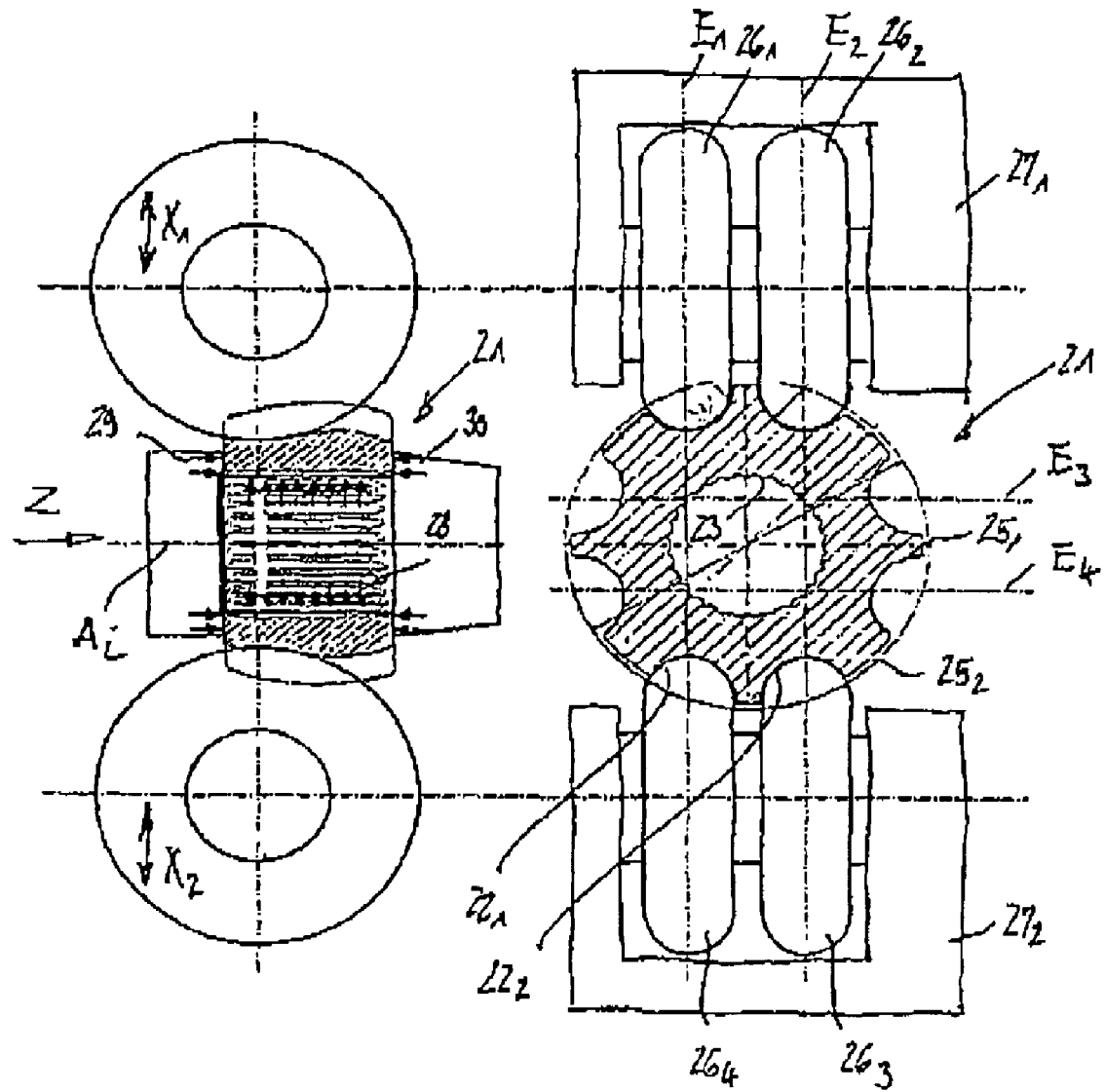

FIG. 2 shows a first embodiment of a process for machining in a chip-forming way ball tracks in an inner joint part by disc tools:

A) in a longitudinal section through the longitudinal axis of the inner joint part; and B) in a cross-section through the longitudinal axis of the inner joint part.

Figure 3:
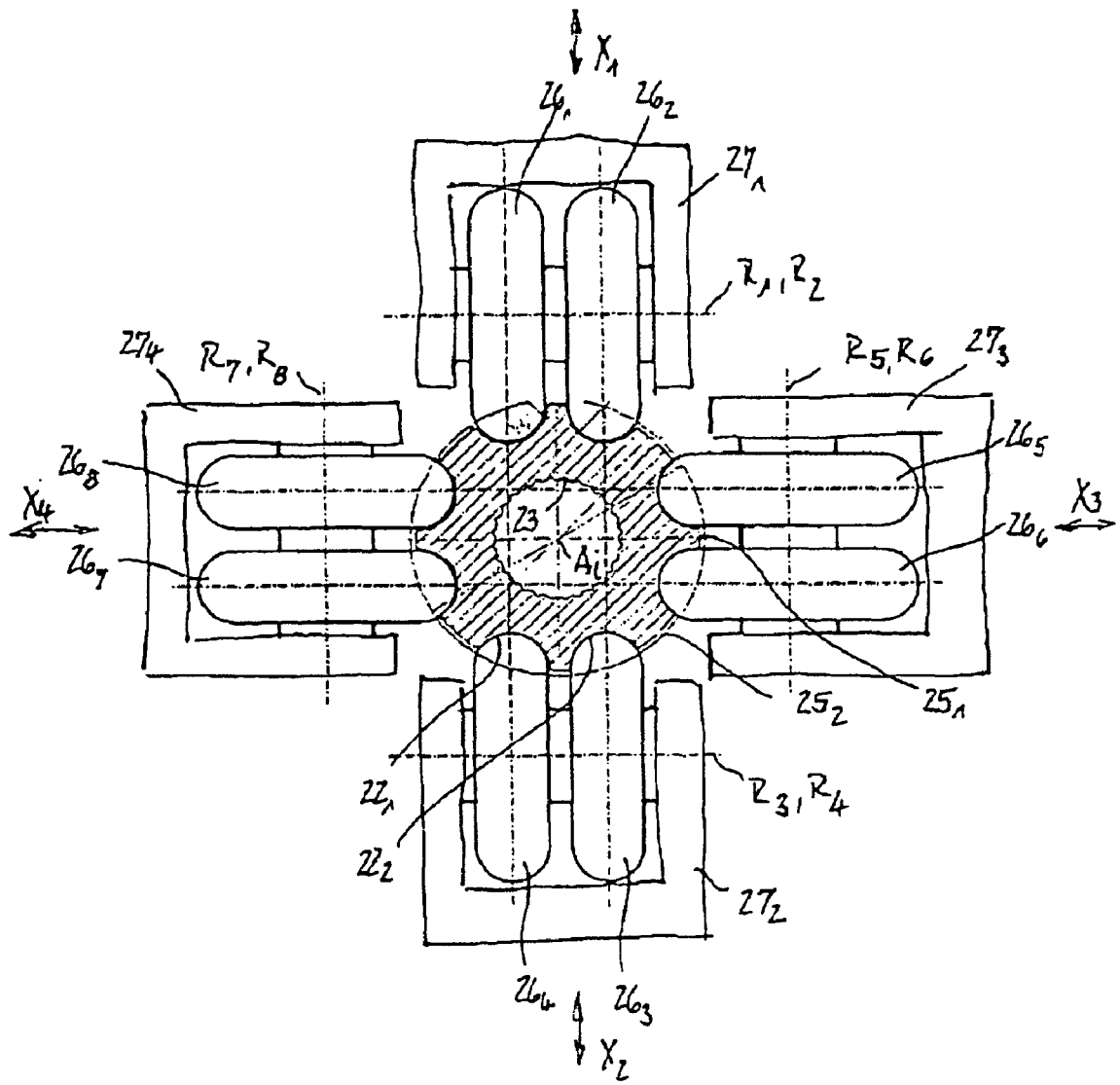
Figure 4A:
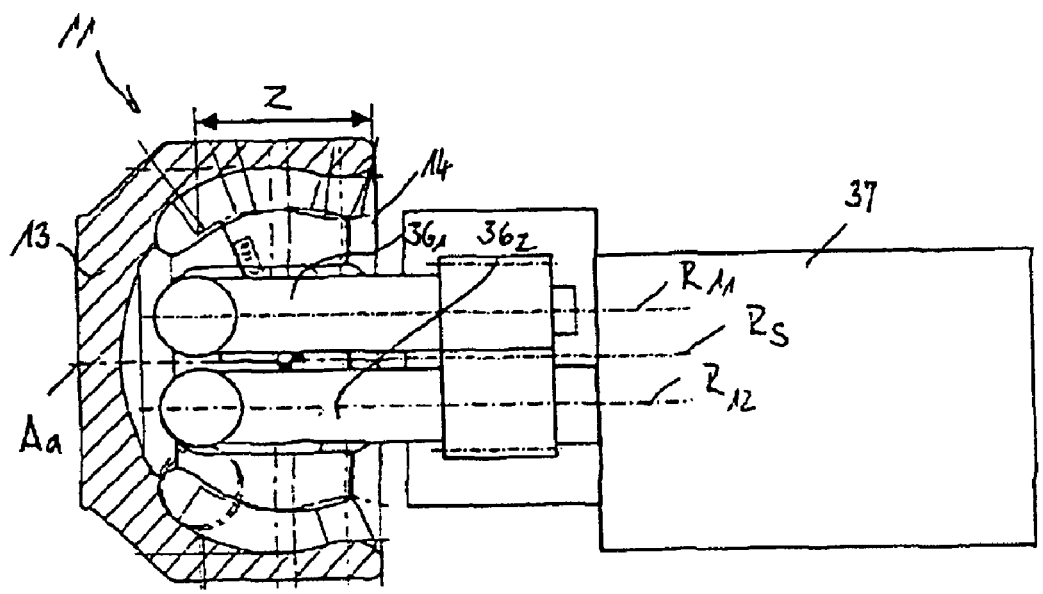

FIG. 3 shows a process of machining in a chip-forming way ball tracks in an inner joint part in a cross-section through the longitudinal axis of the inner joint part by disc tools, FIG. 4 shows a process of machining in a chip-forming way the ball tracks of an outer joint part by axis-parallel finger tools;

A) in a first longitudinal section through the longitudinal axis of the outer joint part; and B) in a second longitudinal section through the longitudinal axis of the outer joint part, extending perpendicularly thereto.

Figure 5A:
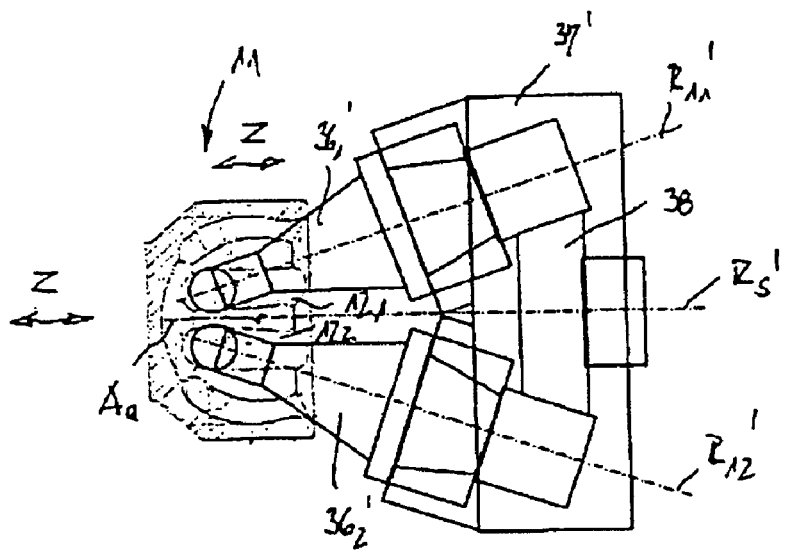
Figure 5B:
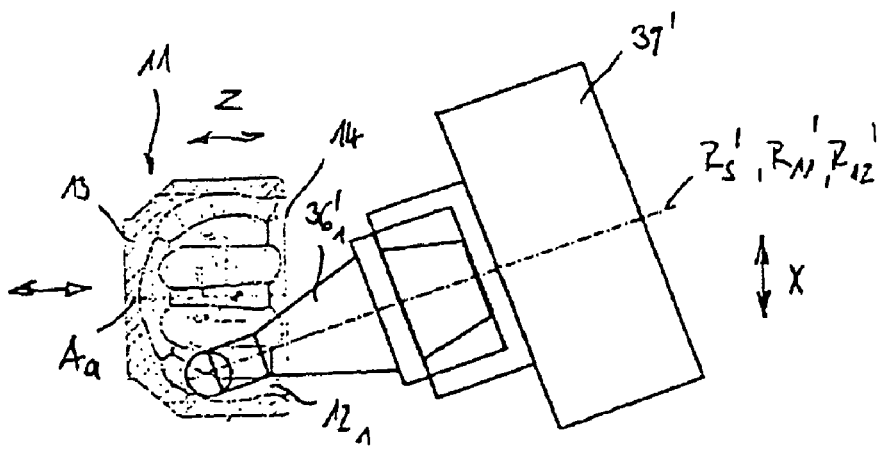

FIG. 5 shows a first embodiment of a process of machining in a chip-forming way the ball tracks of an outer joint part by finger tools enclosing an angle:

A) in a first longitudinal section through the longitudinal axis of the outer joint part; and B) in a second longitudinal section through the longitudinal axis of the outer joint part, extending perpendicularly thereto.

Figure 6A:
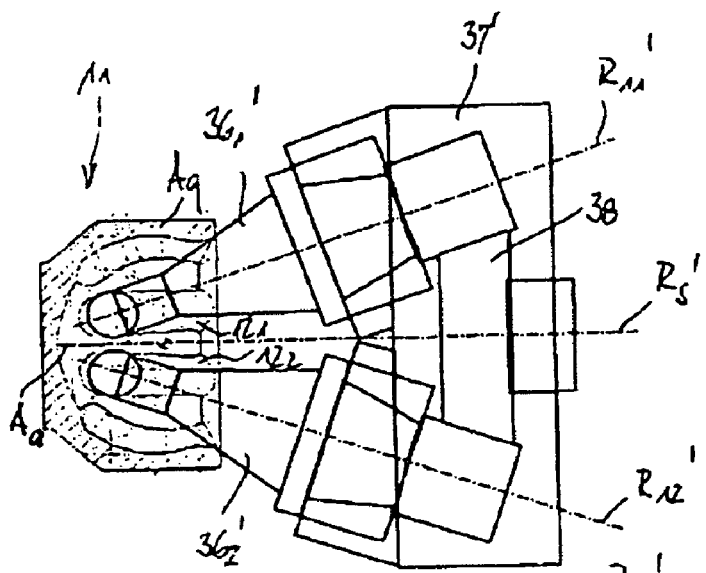
Figure 6B:
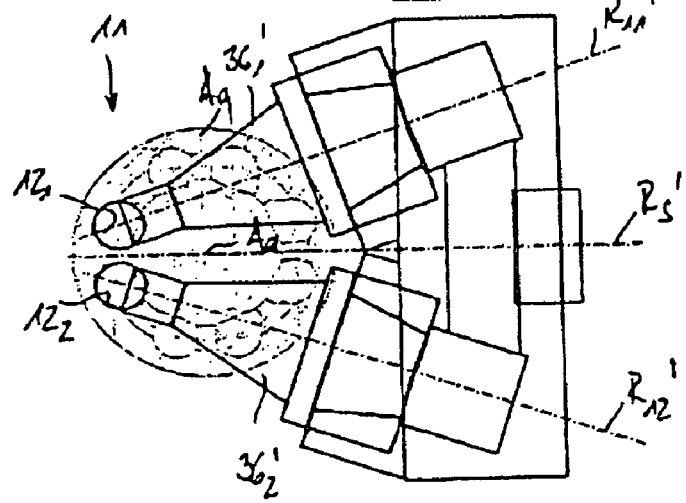

FIG. 6 shows a process of machining in a chip-forming way the tracks of an outer joint part by finger tools enclosing an angle, in an embodiment according to FIG. 5:

A) in a longitudinal section through the longitudinal axis of the outer joint part; and B) in an axial section through the longitudinal axis of the outer joint part.

Figure 7A:
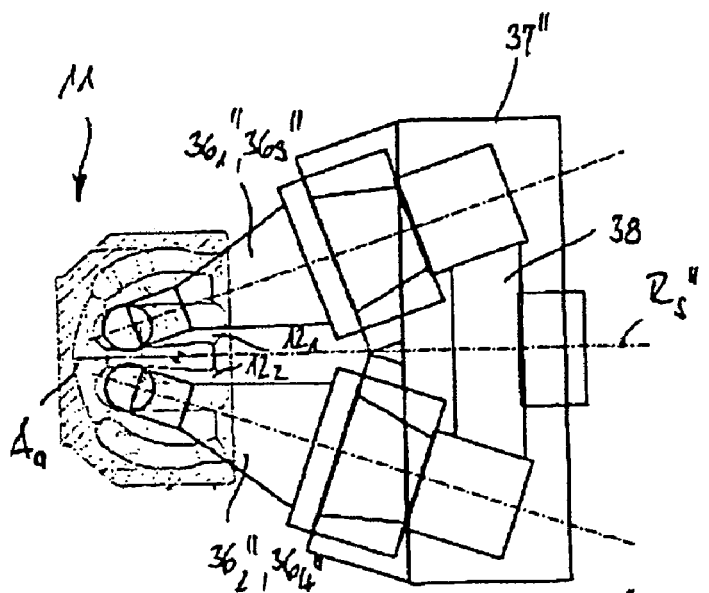
Figure 7B:
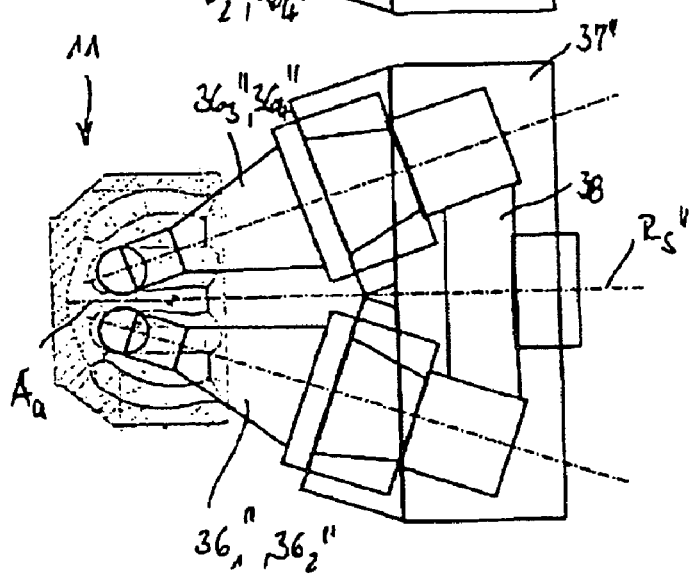

FIG. 7 shows a second embodiment of a process of machining in a chip-forming way the ball tracks of an outer joint part by finger tools enclosing an angle:

A) in a first longitudinal section through the longitudinal axis of the outer joint part; and B) in a second longitudinal section through the longitudinal axis of the outer joint part, extending perpendicularly thereto.

Figure 8:
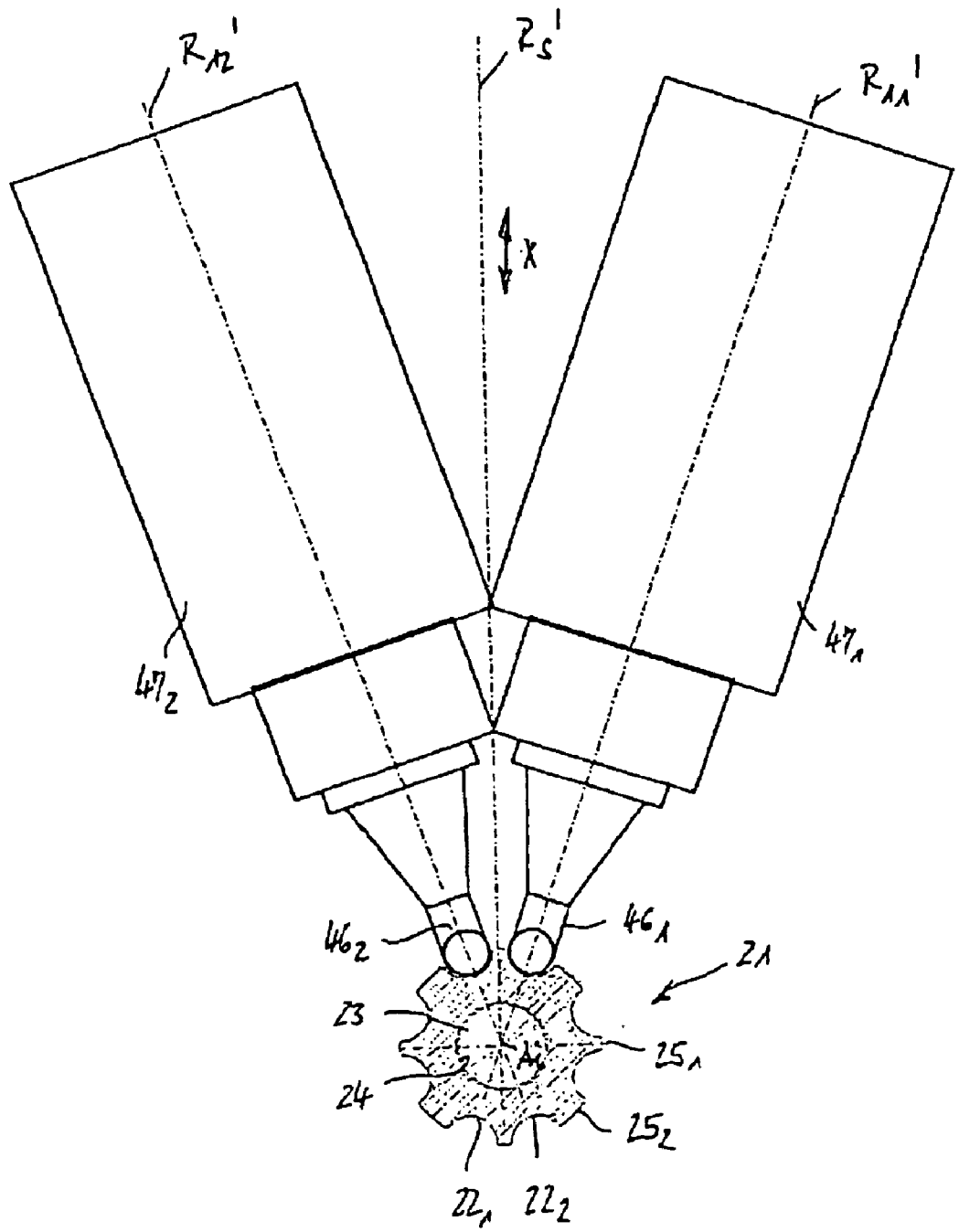

FIG. 8 shows a process of machining in a chip-forming way the ball tracks of an inner joint part by finger tools forming an angle, comprising a first embodiment of a device in a cross-section through the longitudinal axis of the inner joint part.

Figure 9:
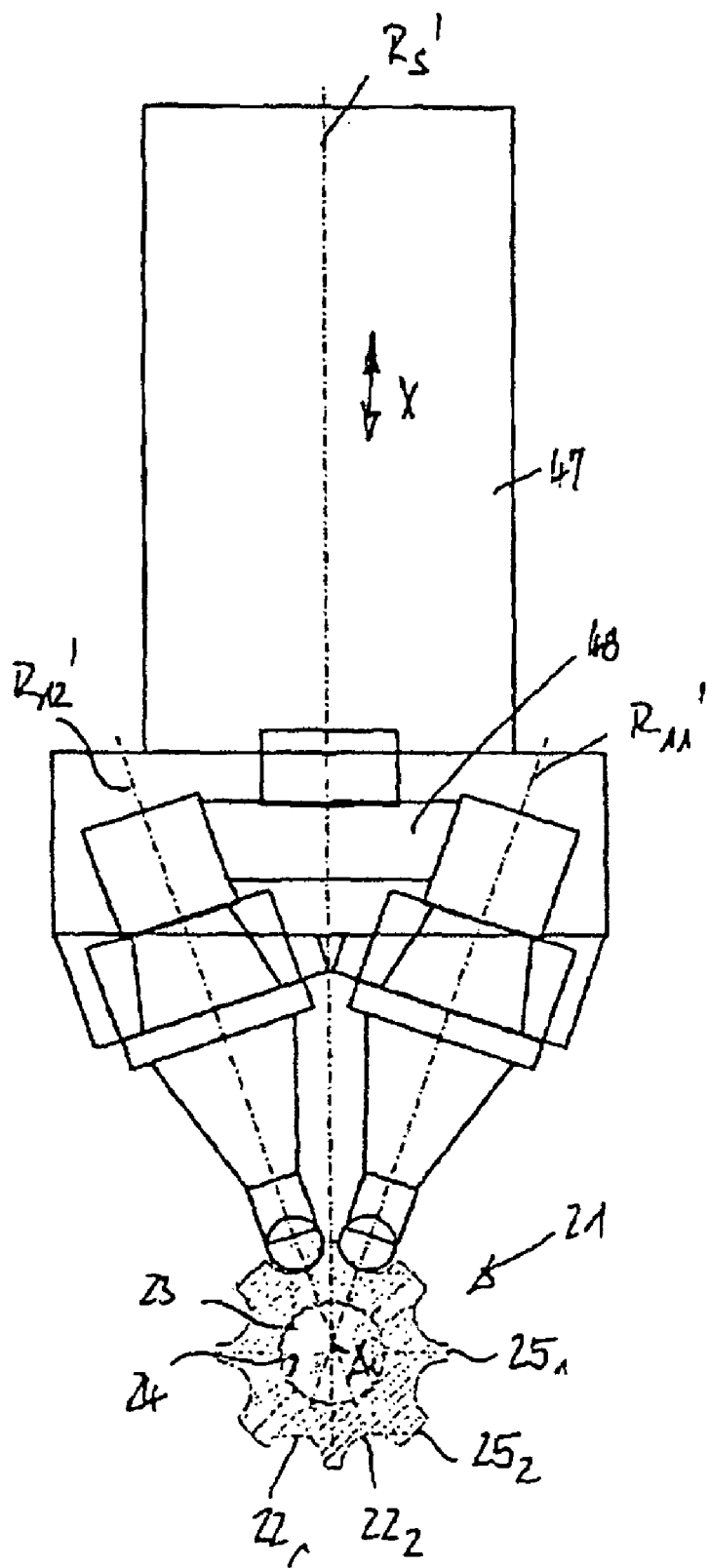

FIG. 9 shows a process of machining in a chip-forming way the ball tracks of an inner joint part by finger tools enclosing an angle, comprising a second embodiment of a device in a cross-section through the longitudinal axis of the inner joint part.

DETAILED DESCRIPTION

Figures 1A, 1B:
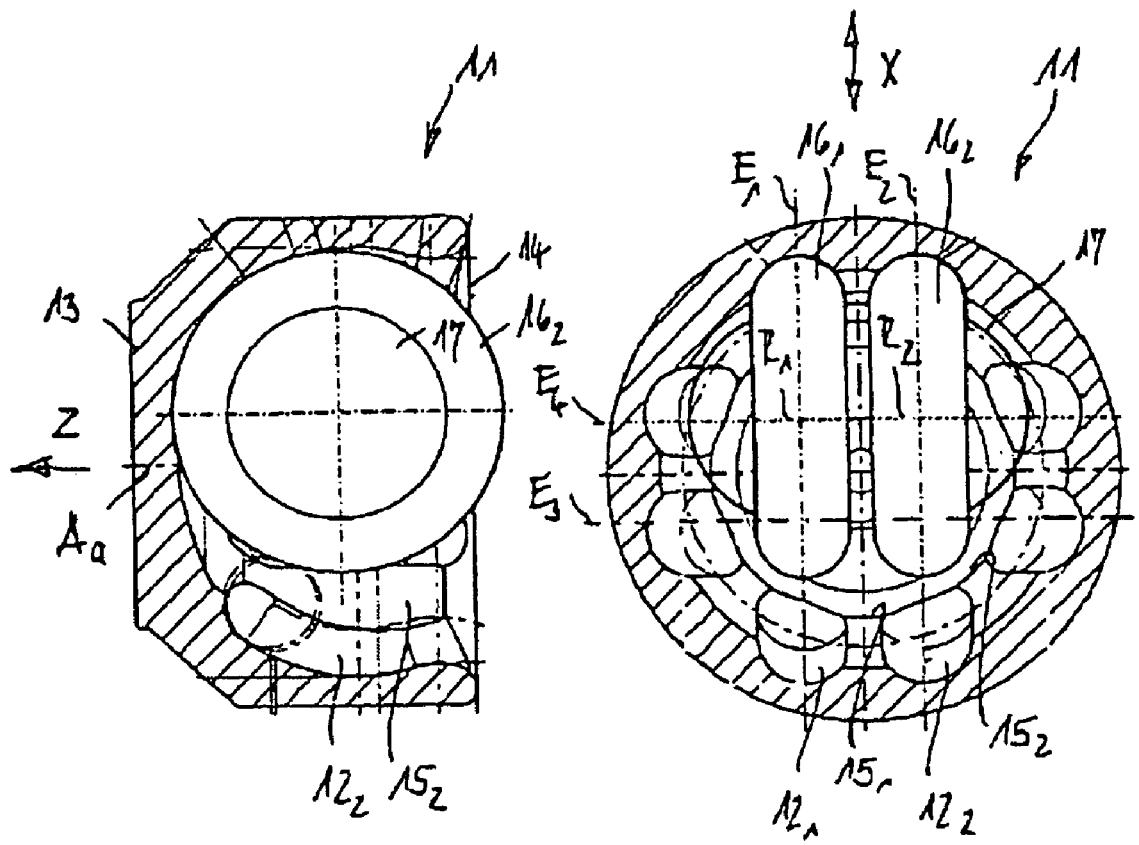
FIG. 1 shows a process for machining in a chip-forming way ball tracks in an outer joint part by disc tools.

FIG. 1 whose illustrations will be described jointly below shows an outer joint part 11 which is provided for a so-called twin ball joint comprising circumferentially distributed ball tracks $12_1$, $12_2$ arranged in pairs around the circumference in such a way that their track center lines extend in parallel planes $E_1$, $E_2$, $E_3$, $E_4$ arranged in pairs. Furthermore, the outer joint part 11 is shown to comprise a joint base 13 and a joint aperture 14. Between the ball tracks $12_1$, $12_2$ there are provided guiding webs $15_1$, $15_2$ of different widths which form part of an inner spherical guiding face for a ball. Whereas the width of the guiding face $15_1$ between a pair $12_1$, $12_2$ of ball tracks remains substantially constant in the longitudinal direction, the width of the guiding face $15_2$ between different pairs of ball tracks changes in the longitudinal direction, which is known in itself. In contrast to standard joints wherein the individual ball tracks are positioned in radial planes, as a result of which the circumferential distance between the individual ball tracks constantly changes in the longitudinal direction, the circumferential distances between the tracks $12_1$, $12_2$ of the pairs of ball tracks $12_1$, $12_2$ of a joint of the type described here are constant in the longitudinal direction.

Because of the way in which the ball tracks extend, it is possible for them to be machined in the manner described here by pairs of rotating disc tools $16_1$, $16_2$ whose axes of rotation $R_1$, $R_2$ extend coaxially and, in this case, are held in a common holding device 17. The holding device 17 is only partially shown because, by necessity, it has to be connected to a drive which extends through the joint aperture 14 into the outer joint part 11. The rotating drive of the disc tools $16_1$, $16_2$ can be effected by a belt drive for example. According to a preferred embodiment of the process, the outer joint part 11, during the mechanical production of a pair of tracks, is displaced only on the longitudinal axis Aa in the direction of the axis Z, while the holding device 17 carries out an entirely transverse movement perpendicularly to the longitudinal axis Aa in the direction of axis X characterized by a double arrow, so that the disc tools $16_1$, $16_2$ have to be displaced. After the chip-forming machining operation carried out on a pair of tracks has been completed, the holding device 17 can be displaced radially or the outer joint part can be displaced axially to such an extent that the disc tools leave the respective pair of tracks completely. Thereafter, the clamping device for the outer joint part 11 (not shown here) can be rotated by the pitch angle between the pairs of tracks $12_1$, $12_2$, in the present case by 90°. This can be followed by a further pair of tracks being machined in a chip-forming way. Said operation is repeated, four times in the present case, until all pairs of tracks $12_1$, $12_2$ have been machined. In this case the machining operation can be milling or grinding.

FIG. 2 shows an inner joint part 21 of a joint whose parallel tracks are arranged in pairs (twin ball joint) being machined in a chip-forming way. The pairs of tracks are designed in such a way that their center lines extend in planes $E_1$, $E_2$, $E_3$, $E_4$ which extend parallel relative to one another. In this case, too, guiding webs $25_1$ are arranged between the tracks of a pair and guiding webs $25_2$ between the tracks of two adjoining pairs, which webs form part of an externally spherical face on which a ball cage of a mounted constant velocity ball joint can be guided. The inner joint part 21 comprises a central aperture 23 with inner shaft teeth 24 for inserting a driving journal. In a longitudinal section, groups of arrows 28, 29, 30 indicate the holding forces of a clamping device which engages the aperture 23. The machining operation can be a milling or grinding operation.

The above-mentioned design of the pairs of tracks $22_1$, $22_2$, in this case, too, makes it possible to carry out a chip-forming machining operation in the preferred way in which two pairs of rotating disc tools $26_1$, $26_2$ and $26_3$, $26_4$ engage radially opposed pairs of tracks $22_1$, $22_2$. With this type of machining process, the inner joint part 21 is fed forward entirely in the direction of the axis Z, whereas the holding devices $27_1$, $27_2$ for the rotating disc tools $26_1$, $26_2$ and $26_3$, $26_4$ which comprises a corresponding driving mechanism move entirely in the X-direction perpendicularly to the longitudinal axis Ai of the inner joint part 21. The axes of rotation $R_1$, $R_2$ as well as $R_3$, $R_4$ extend in pairs coaxially and perpendicularly, at a distance, relative to the longitudinal axis Ai of the inner joint part 21. After the machining operation on two radially opposed pairs of tracks, which is illustrated in the drawing, the rotating disc tools 26 have to be disengaged from the track; thereafter, the clamping device of the inner joint part 21 has to be rotated by the pitch angle between the individual pairs of tracks, in the present case once by 90° to be able to repeat the machining operation on the two further pairs of tracks in the same way. Thereafter, i.e. after only two machining operations have been carried out for the entire inner joint part 21, the process of machining the ball tracks 12 is completed. The individual machining operations can be milling or grinding.

In FIG. 3, details identical to those in FIG. 2 have been given the same reference numbers, and to that extent, reference is made to the description of same. The inventive process of machining pairs of ball tracks in a chip-forming way takes place simultaneously on all four existing pairs of tracks of the ball tracks $22_1$, $22_2$. For this purpose, the device used, in addition to the holding devices and driving m devices $27_1$, $27_2$ for the pairs of rotating disc tools $26_1$, $26_2$ and $26_3$, $26_4$ comprises two further holing devices and driving devices $27_3$, $27_4$ with further pairs of rotating disc tools $26_5$, $26_6$ and $26_7$, $26_8$. The respective axes of rotation of said additional holding devices and driving devices have been given the reference symbols $R_5$, $R_6$ and $R_6$, $R_7$. In a device of this type, the clamping device for the inner joint part 21 does not require the driving mechanism for rotation. In this embodiment, the machining of all the ball tracks $22_1$, $22_2$ of the inner joint part 21 takes place in one single operating phase. During the machining of the pairs of tracks 22, the holding devices $27_1$, $27_2$ and $27_3$, $27_4$ are moved perpendicular to the longitudinal axis Ai, which is indicated by the double arrows $X_1$, $X_2$ and $X_3$, $X_4$, these operations taking place simultaneously with the forward feed of the inner joint part 11 on the longitudinal axis Ai.

Figure 4B:
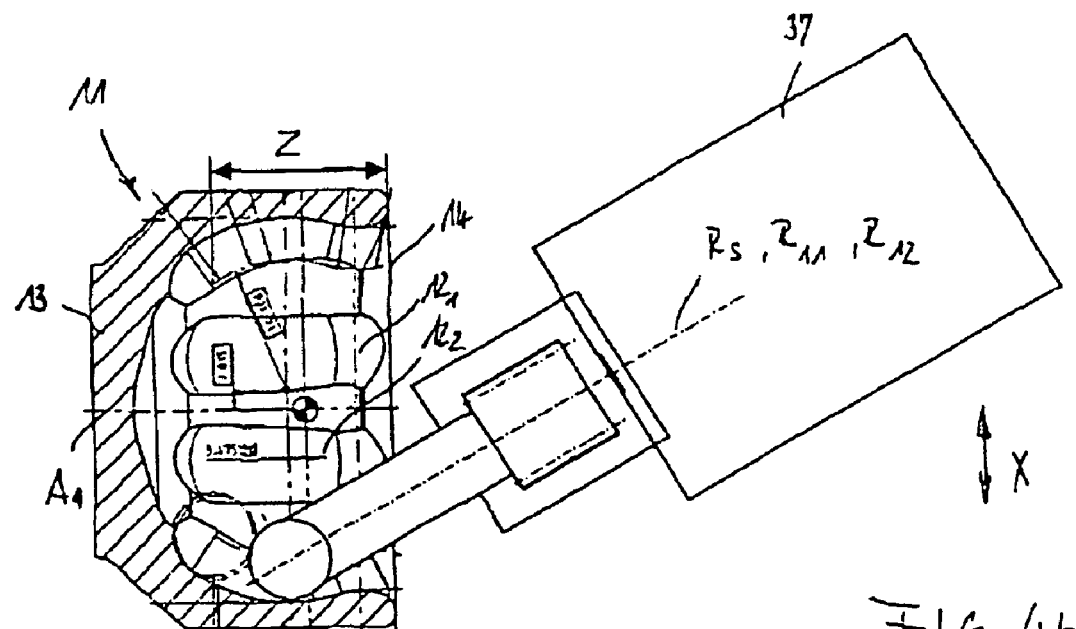

FIG. 4 shows an outer joint part according to FIG. 1 while the machining operation takes place on the ball tracks 12 by way of axis-parallel finger tools. Identical details of the outer joint part 11 have been given the same reference numbers as in FIG. 1. Thus, reference is made to the description of same. For machining one pair of ball tracks $12_1$, $12_2$ there is provided a pair of rotating finger tools $36_1$, $36_2$ which are received in a common holding device and driving device 37 and whose axes of rotation $R_{11}$, $R_{12}$ are arranged parallel relative to one another. To allow a movement along the entire track extension of the pairs of tracks through the aperture 14 of the inner joint part 11, the axis of symmetry Rs between the axes $36_1$, $36_2$ forms an acute angle with the longitudinal axis Aa of the outer joint part 11. The forward feed of the clamping device for the outer joint part 11 is symbolized by the double arrow Z. A double arrow X extending perpendicularly relative to the longitudinal axis Aa indicates the simultaneous forward movement of the holding device 37, Instead of the latter forward movement or in addition thereto, there can be provided a pivot drive for the holding device 37 by which it is possible to continuously change the angle between the axis of symmetry Rs and the longitudinal axis Aa according to FIG. 4B. When machining the pair of tracks in the way illustrated here, the pair of finger tools $36_1$, $36_2$ has to be disengaged from the corresponding pair of tracks $12_1$, $12_2$, and the clamping device for the outer joint part 11 or the holding device and driving device 37 of the finger tools $36_1$, $36_2$ has to be rotated by the pitch angle of the pairs of tracks, i.e. by 90°, around the longitudinal axis Aa. Preference is given to the rotation of the clamping device of the outer joint c part 11.

FIG. 5 shows a further process of and device for machining the ball tracks 12 of an outer joint part 11, wherein the finger tools $36_1'$, $36_2'$ are held in a common holding device 37', with their axes of rotation $R_{11}'$, $R_{12}'$, enclosing an angle relative to one another. This angle has to be acute enough for the finger tools $36_1'$, $36_2'$ to be able to pass through the aperture 14 of the outer joint part 11 and move m along the entire length of the ball tracks $12_1$, $12_2$. As far as the remaining details of the outer joint part are concerned, reference is made to the description of FIG. 1. The finger tools can be driven jointly by a bevel gear whose axis of rotation is positioned on the axis of symmetry Rs' between the two axes of rotation $R_{11}'$, $R_{12}'$ of the two finger tools $36_1'$, $36_2'$. As already described several times, the outer joint part 11, for machining purposes, can be moved in the direction of the double arrow Z radially relative to the longitudinal axis Aa. After a pair of tracks $12_1$, $12_2$ has been machined, the finger tools are disengaged from the respective pairs of tracks and the outer joint part 11 and the holding device 37' are rotated relative to one another by a pitch angle between the pairs of tracks $12_1$, $12_2$, i.e. by 90° in the present case. It is preferred and the process is easier to carry out if there is provided a rotary drive for the clamping device of the outer joint part 11. The machining operations can be either milling or grinding.

FIG. 6 shows the device according to FIG. 5 with reference to a modified process for machining the ball tracks 12 of an outer joint part 11, wherein the finger tools $36_1'$, $36_2'$ are held in a common holding device 37' and whose axes of rotation $R_{11}'$, $R_{12}'$ enclose an angle relative to one another. This angle has to be acute enough for the finger tools $36_1'$, $36_2'$ to be able to pass through the aperture 14 of the outer joint part 11 and move along the entire length of the ball tracks $12_1$, $12_2$. As far as the remaining details of the outer joint part are concerned, reference is made to the description of FIG. 5. The finger tools can be driven jointly by a bevel gear 38 whose axis of rotation is positioned on the axis of symmetry Rs' between the two axes of rotation $R_{11}'$, $R_{12}'$ of the two finger tools $36_1'$, $36_2'$. Hereafter, for machining purposes, the outer joint part 11 can be moved in the direction of the double arrow Z along a longitudinal axis Aa, and it can additionally be rotated around a transverse axis Aq. After a pair of tracks $12_1$, $12_2$ has been machined, the finger tools are disengaged from the respective pairs of tracks and the outer joint part 11 and the holding device 37' are rotated relative to one another by a pitch angle between the pairs of tracks $12_1$, $12_2$, i.e. by 90° in the present case.

FIG. 7 shows a further process of and device for machining the ball C tracks 12 of an outer joint part 11, wherein the finger tools $36_1''$, $36_2''$, $36_3''$, $36_4'$ are held in a common holding device 37'', with their axes of rotation $R_{11}''$, $R_{12}''$ enclosing identical angles relative to an axis of symmetry Rs''. These angles have to be acute enough for the finger tools $36_1'$, $36_2'$, $36_3''$, $36_4''$ to be able to pass through the aperture 14 of the outer joint part 11 and move along the entire length of the respective ball tracks. As far as the remaining details of the outer joint part 11 are concerned, reference is made to the description of FIG. 1. The finger tools can be driven jointly by a bevel gear 38 whose axis of rotation is positioned on the axis of symmetry Rs''. As already described several times, the outer joint part 11, for machining purposes, can be moved along its longitudinal axis Aa, whereas the holding device 37'' is moved radially relative to the longitudinal axis Aa. After two pairs of tracks $12_1$, $12_2$ have been machined, the finger tools are disengaged from the latter pair of tracks and the outer joint part 11 and the holding device 37'' are rotated relative to one another by a pitch angle between the pairs of tracks, i.e. by 90° in the present case.

FIG. 8 describes a process of machining the pairs of tracks of the ball tracks 22 of an inner joint part 21 whose details have been given the same reference numbers as in FIG. 2. To that extent, reference is made to the description of same. For machining the pairs of tracks $22_1$, $22_2$, there are provided finger tools $46_1$, $46_2$ which are each received in independent holding devices and rotary driving devices $47_1$, $47_2$. The axes of rotation $R_{11}'$, $R_{12}'$ of the rotatingly drivable finger tools $46_1$, $46_2$ again form an angle relative to one another which is preferably held constant during the entire machining operation. The movements during the chip-forming machining operation carried out on the pairs of tracks $22_1$, $22_2$ preferably take place in such a way that the inner joint part 21 is moved in the direction of its longitudinal axis Ai, i.e. along the repeatedly mentioned Z-direction, entirely axially, whereas the devices $47_1$, $47_2$ are moved in the X-direction, i.e. radially relative to the longitudinal axis Ai, in the direction of the axis of symmetry Rs' of the two axes of rotation $R_{11}'$, $R_{12}'$. After the chip-forming machining operation carried out on a pair of tracks $22_1$, $22_2$ has been completed, the rotating finger tools $46_1$, $46_2$ are disengaged from the machined pair of tracks, and the clamping device for the inner joint part 21 is rotated by the pitch angle between the individual pairs of tracks, i.e. 90° in the present case. Thereafter, the process is repeated, i.e. carried out four times in the same way for the four pairs of tracks shown here.

FIG. 9 shows a process for machining the pairs of tracks 22 of an inner joint part 21, which largely corresponds to that shown in FIG. 6. To that extent, reference is made to the drawing of the inner joint part and to the description of the process. However, FIG. 9 deviates from FIG. 6 in that two finger tools $46_1$, $46_2$ are received in a common holding device 47 which comprises a bevel gear 48 forming a common drive for the rotating fingers tools $46_1$, $46_2$. The axes of rotation $R_{11}'$, $R_{12}'$ of the finger tools $46_1$, $46_2$, in this case, too, form an angle relative to one another. The preferred movements of the inner joint part 21 and of the tools relative to one another take place in such a way that the inner joint part 21 is displaced only in the direction of its longitudinal axis Ai, i.e. in the Z-direction, whereas the tools are displaced radially relative to the Z-direction in the direction of the double arrow X, and, respectively, in the direction of the axis of symmetry Rs' between the axes of rotation $R_{11}'$, $R_{12}'$.

The invention claimed is:

1. A process of machining an outer joint part or an inner joint part of a constant velocity universal ball joint, which outer joint part or inner joint part comprises a longitudinal axis (Aa, Ai) and a number of ball tracks, wherein the ball tracks are each arranged circumferentially in pairs whose central track lines are positioned in planes extending parallel relative to one another, comprising:

machining the pairs of ball tracks by rotating disc tools whose axes of rotation (R) perpendicularly intersect the respective longitudinal axis (Aa, Ai) at a distance from one another and are held and guided coaxially relative to one another, during machining, guiding the outer joint part or inner joint part linearly in the direction of its respective longitudinal axis (Aa, Ai), and, during machining, guiding the disc tools synchronously in a linear or pivoting movement, about their axes of rotation (R), radially relative to the respective longitudinal axis (Aa, Ai).

2. A process according to claim 1, wherein at least two pairs of radially opposed ball tracks are machined simultaneously.

3. A process according to claim 1, wherein the disc tools are driven in pairs at substantially the same speed.

4. A device for machining an outer joint part or inner joint part of a constant velocity universal ball joint, which outer joint part or inner joint part comprises a longitudinal axis (Aa, Ai) and a number of ball tracks, wherein the ball tracks are each arranged circumferentially in pairs whose central track lines are positioned in planes, comprising:

a clamping mechanism for said outer joint part or said inner joint part, and at least two disc tools whose axes of rotation (R) extend coaxially relative to one another and which perpendicularly intersect the respective longitudinal axis (Aa, Ai) of the outer joint part or inner joint part at a distance from one another, wherein the clamping mechanism comprises a feeding device for axial feeding in the direction of the respective longitudinal axis (Aa, Ai), and comprising a feeding device for feeding the disc tools radially relative to the respective longitudinal axis (Aa, Ai).

5. A device according to claim 4, wherein at least two disc tools comprise a common rotary drive.

6. A device according to claim 5, wherein the at least two disc tools are integrally formed.

7. A device for machining an outer joint part or inner joint part of a constant velocity universal ball joint, which outer joint part or inner joint part comprises a longitudinal axis (Aa, Ai) and a number of ball tracks, wherein the ball tracks are each arranged circumferentially in pairs whose central track lines are positioned in planes, comprising:

a clamping mechanism for said outer joint part or said inner joint part, and at least two disc tools whose axes of rotation (R) extend coaxially relative to one another and which perpendicularly intersect the respective longitudinal axis (Aa, Ai) of the outer joint part or inner joint part at a distance from one another, wherein the clamping mechanism comprises a feeding device for axial feeding in the direction of the respective longitudinal axis (Aa, Ai), and comprising a pivoting device for pivoting the disc tools around a pivot axis intersecting the respective longitudinal axis (Aa, Ai).

* * * * *